(12) United States Patent
Austin et al.

(10) Patent No.: US 11,379,832 B2
(45) Date of Patent: Jul. 5, 2022

(54) SYSTEMS AND METHODS OF BLOCKCHAIN FOR TRANSACTION REWARDS ON TOKEN LOCKING

(71) Applicant: 0Chain, LLC, San Jose, CA (US)

(72) Inventors: Thomas H. Austin, San Jose, CA (US); Saswata Basu, Cupertino, CA (US)

(73) Assignee: 0Chain, LLC, San Jose, CA (US)

( * ) Notice: Subject to any disclaimer, the term of this patent is extended or adjusted under 35 U.S.C. 154(b) by 60 days.

(21) Appl. No.: 16/213,360

(22) Filed: Dec. 7, 2018

(65) Prior Publication Data

US 2020/0184469 A1 Jun. 11, 2020

(51) Int. Cl.
*H04L 9/06* (2006.01)
*G06Q 20/38* (2012.01)
(Continued)

(52) U.S. Cl.
CPC .......... *G06Q 20/389* (2013.01); *G06Q 20/40* (2013.01); *G06Q 30/0215* (2013.01)

(58) Field of Classification Search
CPC .. G06Q 20/389; G06Q 30/0215; G06Q 20/40; G06Q 20/3821; G06Q 20/00; G06Q 20/385; G06Q 2220/00; H04L 9/06
(Continued)

(56) References Cited

U.S. PATENT DOCUMENTS 10,250,395 B1 * 4/2019 Borne-Pons .......... H04L 9/3239
2016/0267601 A1 * 9/2016 Kundu ................... G06Q 20/10
(Continued)

FOREIGN PATENT DOCUMENTS

CN 108108487 A * 6/2018 ............. G06F 16/24
CN 110874351 A * 3/2020 ............. H04L 67/10
(Continued)

OTHER PUBLICATIONS

Calvin Liu, How to Earn Interest and Borrow Ethereum Assets, Sep. 27, 2018, https://medium.com/compound-finance/the-compound-guide-to-supplying-borrowing-crypto-assets-94821f2950a0 (Year: 2018).*

(Continued)

*Primary Examiner* — Eric R Netzloff
*Assistant Examiner* — Dipen M Patel
(74) *Attorney, Agent, or Firm* — Levine's Tech Consulting, LLC; Frank E. Levine

(57) ABSTRACT

The systems and methods of a blockchain platform for transactions, comprising: submitting one or more tokens for locking for a period of time; receiving free interest tokens for the locked tokens using a multiplier; sending the interest tokens to perform a transaction to one or more service providers; releasing the locked tokens; wherein submitting, receiving, sending and releasing of tokens is automatically regulated using smart contract protocol on the blockchain platform. The systems and methods of a blockchain platform wherein the smart contract protocol is comprising of: establishing a negotiated token rate for the transaction for negotiated terms of service; invoking signed markers for the transaction; transferring tokens from reward pool to a challenge pool; releasing tokens from challenge pool after authorization, verification and finalization of the transaction.

12 Claims, 10 Drawing Sheets

(51) Int. Cl.
  *G06Q 30/02* (2012.01)
  *G06Q 20/40* (2012.01)
(58) Field of Classification Search
  USPC .................................................. 705/14.71
  See application file for complete search history.

(56) References Cited

U.S. PATENT DOCUMENTS

| | | | |
|---|---|---|---|
| 2017/0213289 A1* | 7/2017 | Doney | G06Q 40/025 |
| 2017/0353309 A1* | 12/2017 | Gray | G06F 21/51 |
| 2018/0025435 A1* | 1/2018 | Karame | H04L 9/3236 |
| | | | 705/30 |
| 2018/0189753 A1* | 7/2018 | Konda | G06Q 20/06 |
| 2018/0218176 A1* | 8/2018 | Voorhees | H04L 9/3213 |
| 2019/0028276 A1* | 1/2019 | Pierce | G06Q 20/223 |
| 2019/0080392 A1* | 3/2019 | Youb | G06Q 40/00 |
| 2019/0087893 A1* | 3/2019 | Pellew | G06Q 20/3825 |
| 2019/0123892 A1* | 4/2019 | Basu | H04L 9/0637 |
| 2019/0124146 A1* | 4/2019 | Austin | H04L 9/0643 |
| 2019/0220836 A1* | 7/2019 | Caldwell | G06Q 20/3829 |
| 2020/0065922 A1* | 2/2020 | Goldstraj | G06Q 50/18 |
| 2020/0162243 A1* | 5/2020 | Fletcher | H04L 9/3247 |

FOREIGN PATENT DOCUMENTS

| | | | | |
|---|---|---|---|---|
| CN | 111078686 A * | 4/2020 | | G06F 16/22 |
| WO | WO-2018172439 A1 * | 9/2018 | | H04L 9/0637 |

OTHER PUBLICATIONS

Steven Price, Matrix AI Network Masternode Rewards, Dec. 3, 2018, medium.com, https://medium.com/@Price_Steven/matrix-ai-network-masternode-rewards-and-roi-eb6ef32c06fa (Year: 2018).*
Almashaqbeh, G. (2019). CacheCash: A cryptocurrency-based decentralized content delivery network (Order No. 13897916). Available from ProQuest Dissertations and Theses Professional. (2272842072). Retrieved from https://dialog.proquest.com/professional/docview/2272842072?accountid=131444 (Year: 2019).*
Imran Bashir, Mastering Blockchain, Mar. 2018 (first published Mar. 2017), ISBN 978-1-78883-904-4, https://users.cs.fiu.edu/~prabakar/cen5079/Common/textbooks/Mastering_Blockchain_2nd_Edition.pdf (Year: 2018).*
Matt Levine, Put Your Bitcoins in the Money Market, May 17, 2018, Bloomberg, https://www.bloomberg.com/opinion/articles/2018-05-17/put-your-bitcoins-in-the-money-market (Year: 2018).*
Samantha Joule Fow, JP Morgan Issues World's First Smart Contract CD on Quorum Blockchain, Apr. 23, 2018, World Crypto Index, https://www.worldcryptoindex.com/jp-morgan-issues-worlds-first-smart-contract-cd-quorum-blockchain/ (Year: 2018).*
Brady Dale, Crypto Money Market Compound Lets You HODL and Earn, Sep. 27, 2018, https://www.coindesk.com/crypto-money-market-compound-lets-you-hodl-and-earn-interest (Year: 2018).*
Robert Leshner, Compund FAQ, Dec. 5, 2018, https://medium.com/compound-finance/faq-1a2636713b69 (Year: 2018).*
Ken Tumin, CD Interest: Let It Accumulate or Receive Regular Payments?, Aug. 3, 2013, https://www.depositaccounts.com/blog/cd-interest-let-it-accumulate-or-receive-regular-payments.html (Year: 2013).*
POW vs. PoS: a comparison of two blockchain consensus algorithms, Jun. 12, 2018, edChain, https://medium.com/@EdChain/pow-vs-pos-a-comparison-of-two-blockchain-consensus-algorithms-f3effdae55f5 (Year: 2018).*
Tom Terado, What is Decentralized Storage? (IPFS, FileCoin, Sia, Storj & Swarm), Jul. 3, 2018, https://medium.com/bitfwd/what-is-decentralised-storage-ipfs-filecoin-sia-storj-swarm-5509e476995f (Year: 2018).*
Proof of Capacity (Cryptocurrency) Definition _ Investopedia, Oct. 25, 2018 (Year: 2018).*
Filecoin: A Decentralized Storage Network, Jul. 19, 2017, Protocol Labs, https://filecoin.io/filecoin.pdf (Year: 2017).*
Su et al., "Smartsupply: Smart Contract Based Validation for Supply Chain Blockchain," 2018 IEEE International Conference on Internet of Things (iThings) and IEEE Green Computing and Communications (GreenCom) and IEEE Cyber, 2018, pp. 988-993, doi: 10.1109/Cybermatics_2018.2018.00186. (Year: 2018).*
C. Ehmke, F. Wessling and C. M. Friedrich, "Proof-of-Property—A Lightweight and Scalable Blockchain Protocol," 2018 IEEE/ACM 1st International Workshop on Emerging Trends in Software Engineering for Blockchain (WETSEB), 2018, pp. 48-51. (Year: 2018).*
Patrick, Merkle Tree & Merkle Root Explained, Nov. 29, 2017, MYCRYPTOPEDIA, https://www.mycryptopedia.com/merkle-tree-merkle-root-explained/ (Year: 2017).*
0Chain Storage Protocol, Thomas H. Austin, Paul Merrill, Siva Dirisala and Saswata Basu, downloaded from whitepapers at https://www.0chain.net/research dated Aug. 31, 2018.
Nader Al-Naji, Josh Chen, and Lawrence Diao. Basis: A price-stable cryptocurrency with an algorithmic central bank. Technical report, Intangible Labs, Jun. 2017.
Sunny King and Scott Nadal. Ppcoin: Peer-to-peer crypto-currency with proof-of-stake. http://primecoin.org/static/primecoin-paper.pdf, 2012.
Jae Kwon. Tendermint: Consensus without mining, https://tendermint.com/static/docs/tendermint.pdf, 2014.
Satoshi Nakamoto. Bitcoin: A peer-to-peer electronic cash system, 2009.
Justin Rietz and Saswata Basu. 0chain economic protocol, 2018.

* cited by examiner

| Blocks Stored | Avg. # Challenges | Median # Challenges |
|---|---|---|
| 31/32 | 35.57 | 27 |
| 30/32 | 16.67 | 13 |
| 29/32 | 10.10 | 6 |
| 28/32 | 9.24 | 6 |
| 27/32 | 7.62 | 6 |
| 26/32 | 5.76 | 4 |
| 25/32 | 5.52 | 4 |
| 24/32 | 4.81 | 4 |
| 23/32 | 4.62 | 4 |
| 22/32 | 3.48 | 2 |
| 21/32 | 3.29 | 3 |
| 20/32 | 2.67 | 2 |
| 19/32 | 2.95 | 3 |
| 18/32 | 2.00 | 2 |
| 17/32 | 2.14 | 2 |
| 16/32 | 2.00 | 1 |
| 15/32 | 2.14 | 2 |
| 14/32 | 1.67 | 1 |
| 13/32 | 1.90 | 2 |
| 12/32 | 1.29 | 1 |
| 11/32 | 1.33 | 1 |
| 10/32 | 1.62 | 1 |
| 9/32 | 1.19 | 1 |
| 8/32 | 1.43 | 1 |
| 7/32 | 1.10 | 1 |
| 6/32 | 1.19 | 1 |
| 5/32 | 1.14 | 1 |
| 4/32 | 1.10 | 1 |
| 3/32 | 1.14 | 1 |
| 2/32 | 1.10 | 1 |
| 1/32 | 1.00 | 1 |

FIG.10

SYSTEMS AND METHODS OF BLOCKCHAIN FOR TRANSACTION REWARDS ON TOKEN LOCKING

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)). In addition, the present application is related to the "Related Applications," if any, listed below.

FIELD OF THE INVENTION

The present invention is in the technical field of cloud computing. More particularly, the present invention is in the technical field of blockchain platform. More particularly, the present invention is in the technical field of finalizing different types of transactions using an efficient token locking and spending system.

BACKGROUND

Internet is a global computer network providing a variety of information and communication facilities, consisting of interconnected networks using standardized communication protocols. Internet is not owned by a single entity and it operates without a central governing body. The same principles of distributed governance were applied to digital currencies by providing ability to perform digital transactions that existed without support from any underlying institution. The digital ledger that records the transactions in a chain using a mathematical hierarchy is called a blockchain.

The current blockchain platform and related applications known to the industry fall short in multiple ways. The cost of performing transactions on a blockchain are enormous. There is network and resources congestion on the blockchain. Clients have to spend tokens to get anything done on the blockchain. When the system does not promote or incentivize client spending, the usage of the blockchain platform and its related applications decreases over time. Service Providers do not prioritize servicing the requests and efficiency of the blockchain platform is compromised. A system or framework that promotes client spending, service providers engaging in servicing the transactions and having an overall increase of the number of transactions finalized or committed is needed.

SUMMARY OF THE INVENTION

The present invention is systems and methods of a blockchain for transactions, comprising: submitting one or more tokens for locking for a period of time; receiving free interest tokens for the locked tokens using a multiplier; sending the interest tokens to perform a transaction to one or more service providers; releasing the locked tokens; wherein submitting, receiving, sending and releasing of tokens is automatically regulated using smart contract protocol on the blockchain platform.

The systems and methods, further comprising: queueing the transaction on the blockchain platform based on quantity of the locked tokens; evaluating reward versus size of the transaction to make a decision to stake; staking the locked tokens to follow terms of service on the blockchain platform; losing the staked tokens if any of the terms of service are violated; earning additional tokens for providing service following the terms of service;

The systems and methods, further comprising: providing a long-term service to the blockchain platform; earning additional tokens that are a percentage of the earned tokens from the transaction.

The systems and methods, wherein the transaction includes a storage transaction and different service providers include a miner, a sharder, or a blobber.

The systems and methods, wherein the storage transaction includes use of one or more blockchain platforms or non-blockchain platforms with either block level storage or file level storage.

The systems and methods, wherein the smart contract protocol is comprising of: establishing a negotiated token rate for the transaction for negotiated terms of service; invoking signed markers for the transaction; transferring tokens from reward pool to a challenge pool; releasing tokens from challenge pool after authorization, verification and finalization of the transaction.

The systems and methods, wherein the authorization includes Boneh-Lynn-Shacham signatures for a device.

The systems and methods, wherein the signed markers comprising of: root information, the hash of the root directory on the file system, previous root information for versioning, and write counter to give the total size to date of the data.

The systems and methods, further comprising: receiving authorization ticket confirming the transaction and terms of service.

The systems and methods, further comprising: sharing the authorization ticket for read.

BRIEF DESCRIPTION OF THE DRAWINGS

The embodiments of this invention are illustrated by way of example and not limitation in the figures of the accompanying drawings, in which like references indicate similar elements and in which:

FIG. 10 outlining the challenge protocol experimental results.

DETAILED DESCRIPTION OF THE INVENTION

Figure 1:
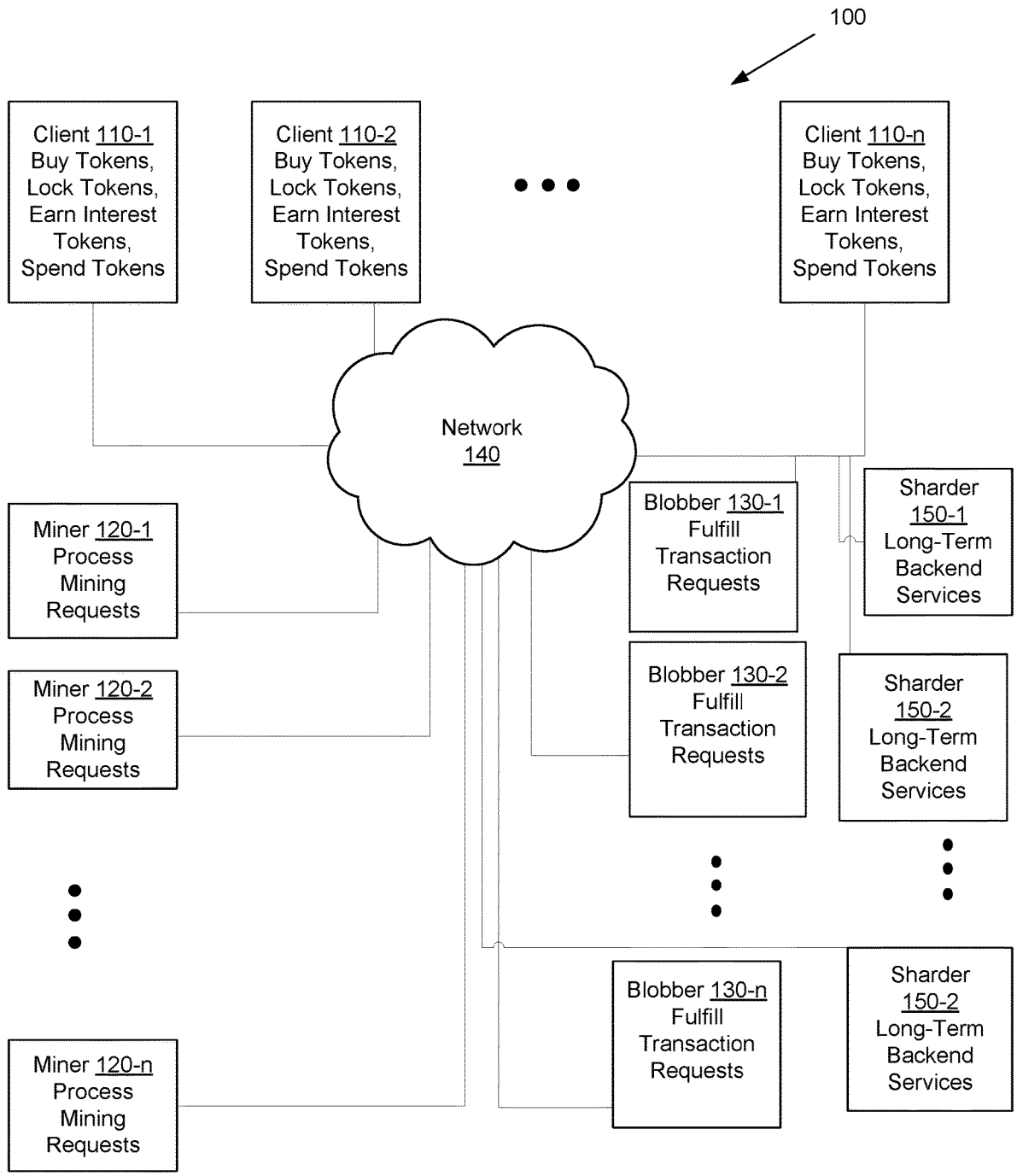
FIG. 1 shows a diagram illustrating an example of a system and method of a blockchain platform for transaction rewards on token locking.

The systems and methods of a blockchain for transaction rewards on token locking allows a client to engage in transactions without spending the originally owned tokens. The blockchain smart contract controlled system provides a pool mechanism to lock tokens for a period of time that earn interest. Client may then freely spend the interest tokens without spending their owned tokens. Service providers including miners, blobbers and sharders engage in a transaction by their free will based on evaluation of rewards and the cost of engaging in servicing that transaction. Sharders are long-term service providers who get rewarded a percentage of tokens from the mining pool and not necessarily with each transaction. Such a framework allows for long-term or community based services as well.

In one embodiment, the transaction requested is for a storage application. While the transaction requested is, for example, a storage application described herein, a person of ordinary skill in the art would understand and apply the same invention disclosure on different types of distributed applications. The use of a distributed storage application is exemplary and not limiting in anyways the scope of the invention.

In one embodiment, the blockchain introduces a token-locking reward model; rather than spending tokens, clients lock tokens to pay for services. This act creates more tokens, which can be used to reward miners or other entities for their work. Clients lock tokens to generate new tokens for miners, but as with transaction fees, a client may offer to lock a greater amount of tokens to ensure that their transaction is accepted by the mining network.

When clients lock tokens, they can give the newly generated tokens to any other client, facilitating a market for creating distributed applications (dApps). In this manner, tokens in our network can be used to buy services for "free", in the sense that the client does not lose their tokens, but still gives something of value to the service providers.

In one embodiment, the token-locking reward model is used to build a distributed Application for storage known as the blockchain-observable storage system (BOSS). With BOSS, storage providers are rewarded for their work by clients who lock tokens. We also show how BOSS can ensure that neither clients nor storage providers can cheat one another; this process relies on special, signed markers that ensure public agreement between the two parties. Additionally, this agreement can be publicly validated; third parties can verify that the storage provider is storing the agreed-upon data using nothing more than public transactions on the blockchain and signed messages from the client.

One of the properties of our design is that the clients may give themselves the newly generated tokens (hereafter referred to as interest). An alternate design could restrict a client to only reward service providers. However, that approach would incentivize clients to feign services in order to mint new tokens; we legitimize this behavior and eliminate such shenanigans.

An interesting economic consequence of this design is that it reduces the opportunity cost of holding a token versus holding a fiat currency in an interest bearing bank account. The interest paid at least partially offsets a possible reduction in the token value. If the level of interest paid moved inversely with the token price the interest payment might substantially offset changes in token value, which could be a stabilizing factor. If the token price decreases, people will lock more tokens in expectation of receiving a higher interest rate, and this locking of tokens in effect reduces supply, creating upwards pressure on the token price.

The present invention disclosure has the following desirable properties: (1) The token-locking reward model, which enables clients to reward service providers by locking tokens, without needing to sacrifice their tokens. (2) The model can be used to incentivize miners to accept transactions and generate blocks. (3) The token-locking reward model is used to build a distributed storage application allowing clients and storage providers to negotiate an agreement for service. As with incentivizing miners, the framework can reward storage providers for their work without requiring the client to sacrifice tokens. (4) The use of signed markers in the blockchain is used to validate a storage provider's work. (5) The blockchain model can reduce price instability typically associated with cryptocurrencies.

In our model, clients can generate new tokens by locking their existing tokens via a write transaction to the blockchain. These tokens when locked cannot be spent for a period of time. However, this transaction immediately creates new tokens, in essence a form of prepaid interest. Clients reward the newly generated tokens to other clients, which may be a miner or the clients themselves. We refer to the client who holds the tokens as the owner, and the client receiving the reward as the recipient or the reward recipient, noting that the recipient and the owner might be the same client. After the locking period has elapsed, the client regains the use of the locked tokens.

Interest Payment Models. Our design pays interest immediately upon locking tokens, known as a prepay model. However, different payment models can be built with this design and the notion of pools. Postpay is an alternate method. The owner of tokens might wish to delay the reward to a service provider until once the service has been provided. To achieve this goal, the owner locks tokens and gives the interest to a pool where the smart contract would hold the funds until after the period had elapsed.

Ongoing payment is another alternate method. The client and provider might negotiate terms to pay the reward to the service provider over a period of time. In this model, the reward is set aside in a pool as soon as the client's tokens are locked. The smart contract allows the service provider to draw a pro-rated amount of the funds until all of the funds have been spent.

Pay upon authorization is another alternate method. The token owner might wish to set aside the interest in a pool that a service provider could draw from upon special authorization. The smart contract requires a signed authorization from the token owner for every withdrawal, where the authorization specifies the token amount and any other criteria.

In one embodiment, a pool is an account holding tokens, where a smart contract restricts when and how the tokens may be spent. When a client locks tokens, they are set aside in a pool that cannot be used for any other spending for 90 days (enforced by the smart contract). Other pools may have different restrictions, depending on how different service providers are paid.

In some cases, a third party might be permitted to invoke the smart contract to pay out interest to the reward recipient from a pool. We refer to these entities as executors. Typically, the executor is the recipient. A pool may contain sub-pools; that is, within a pool, the smart contract can enforce that certain funds are earmarked for different entities.

Locking Tokens. To lock tokens, a client writes a special transaction called a lock transaction, which specifies: The amount ($A_{lock}$) of tokens to lock in a pool. The amount ($A_{spend}$) of tokens that the client wishes to spend; these tokens will be removed from the client's account and added to the interest paid out to the recipients. The recipients (clients or pools) of the reward R. The reward R paid to the recipients is based on an interest rate multiplier M, the amount of tokens locked ($A_{lock}$), and the amount of tokens the client chose to spend ($A_{spend}$). The formula is given: R=(M*Alock)+Aspend. The $A_{spend}$ parameter allows a client to pay an additional reward beyond the interest (M $A_{lock}$) earned from locking tokens.

For instance, Alice might own 102.5 tokens. She wishes to purchase a service from Bob, who demands 3.5 tokens for his total reward. If the interest rate multiplier M is set to 0.025, then R=2.5625, which does not meet Bob's requirement. Instead, Alice can lock 100 tokens to create 2.5 tokens of interest, given to Bob. She adds an additional token to the reward, giving Bob the 3.5 tokens he requires. Alice retains 1.5 unlocked tokens, and a pool of 100 tokens that will be unlocked after 90 days. A person of ordinary skill in the art would understand that such a design allows a new client to experiment with the blockchain platform more cheaply before committing to buying a large amount of tokens. The platform promotes more profitability for the client when the client chooses to pay for services solely through locking tokens.

Writing Transactions. Our system is designed to be largely agnostic with regards to the underlying blockchain. However, the miners must be compensated in some manner for their work. Here we review how our token-locking reward model can still incentivize the miners to produce new blocks. When clients wish to write transactions to the blockchain, they specify a transaction reward in terms of locked tokens and spent tokens. The transaction will have a size in bytes S. Based on the locked amount, miners can prioritize which transaction gets on the block. Miners queue the transactions on the block based on their assigned priority. Miners maximizing their profit will select from these transactions to maximize R/S. This design allows a client to designate transaction rewards as needed, locking as many tokens as required for its transaction to be accepted. Our approach also allows the blockchain ecosystem to seamlessly transfer between a free and paid model, permitting the client to spend tokens instead of locking them in case transaction fees rise to particularly high levels.

When clients wish to write transactions to the blockchain, they specify a transaction fee in terms of locked tokens and spent tokens. We define the total rewards for the transaction reward as $R_{total}$. The transaction will also have a size in bytes S. Miners maximizing their profit will select from these transactions to maximize $R_{total}$/S. Other criteria affecting the throughput of the block might affect the miner's decision, such as the overhead of executing the smart contract.

When a miner accepts a client's transaction, it locks the client's tokens and transfers the rewards to the different entities responsible for building and maintaining the blockchain. The transaction reward is divided between: (i) $R_{miner}$, the miner's share of the reward for including the block in a transaction; (ii) $R_{sharders}$, paid to a special sharder reward as a reward to the sharders for storing the blockchain; (iii) $R_{validators}$, also paid to the sharder reward pool, but reserved as the validators reward for verifying that the sharders are storing the blocks; where $R_{total}=R_{miner}+R_{sharders}+R_{validators}$. The ratio of payout between the miners, sharders, and validators can be determined by the mining network on the blockchain platform.

The blockchain also includes the role of sharders responsible for long term storage of the blocks. Sharders can be rewarded for their work by requiring a percentage of the mining rewards to be paid to them. Assuming that the economic considerations for the sharders are similar to those of miners, the miner's actions should reasonably satisfy the needs of the sharders.

In one embodiment, unlike miners, sharders are not paid by clients directly. Instead, sharders receive a portion of all transaction fees received from all blocks. For each generated block, a portion of the transaction fee is allocated to the sharder reward pool. Periodically, the mining network challenges a randomly selected shareder to prove that it is storing the blocks that it is required to store. The miners conducting the challenge are referred to as validators. Once the validators have concluded their challenges, they submit a transaction to the blockchain paying the sharder (if the sharder passed the challenge) and rewarding the validators for their work in conducting the challenge. If the sharder failed the test, the rent is burned and some portion of the sharder's stake is seized. Otherwise the reward is paid to the sharder. The validators serve as executors on the sharder reward pool. The sharder receiving the payout and the validators verifying the sharder's work are selected by the mining network; if the validators attempt to pay clients other than the validators or the challenged sharder, their transaction will be rejected.

Staking Tokens. A service provider can be required to stake tokens as part of its service guarantee. This process is similar to locking tokens: the principal is locked in a pool payable to the service provider, and the service provider immediately receives the interest for the locked tokens.

A key difference, however, is that the smart contract permits (some portion of) the staked tokens to be seized if the terms of service are not met. The terms and conditions of this smart contract can be specific to the service provided.

An important property of our design is that honest service providers do not have an economic disincentive to stake their tokens. They receive the interest on their staked tokens just as if the tokens had been locked, and earn additional tokens for providing their service.

Blockchain Observable Storage System (BOSS). The storage application using the underlying token locking and transaction rewards system using techniques for authentication and verification or validation of work performed by service providers. This promotes resiliency on the system. Clients using resilient techniques including erasure codes are able to recover quickly from a malicious attack or rogue service provider.

We describe the BOSS system in steps below. First, the client and blobber negotiate the price and terms of service, establishing a read price and write price that determines the tokens required per gigabyte of data read or written, respectively. At the end of their interaction, the client has an agreement signed by both the client and blobber. The client writes a transaction to the blockchain committing both the client and the blobber to their agreement.

The client locks tokens and gives the interest to a pool for the blobber's rewards. The client may decide to lock additional tokens to replenish the pool when it has been depleted. The tokens in this pool represent the funds allocated for the blobber, which cannot be used to reward any other blobbers. The blobber can verify the funds in this pool and may refuse to accept data if the client does not have sufficient tokens locked in this pool. It is possible that the tokens in the blobber reward pool are not used by the client before the negotiated end of the terms of service. Once the terms of service have expired, any tokens remaining in this pool are transferred to the client. The client may also write a special cancellation transaction to end the terms of the agreement early; the blobber reward pool is then emptied out, with all tokens transferred to the client. This mechanism gives the client an escape in case the blobber fails to live up to the terms of service.

We note that the client could abuse this cancellation mechanism in order to cheat the blobber, canceling the agreement before the blobber can claim its due rewards. We address the timing issues that arise by delaying the unlocking of funds for 24 hours. In that time, the blobber may claim any outstanding rewards for its work as per normal operation.

The blobber reward pool is earmarked specifically for the blobber. The blobber will not provide service if the corresponding pool has insufficient funds. Since no other entity has access to the tokens in this pool, the blobber may cache its information about the pool, avoiding the need to check the blockchain for the balance of the pool.

To upload a file, a client contacts the blobber and uploads a file, including a signed write marker that authorizes the blobber to invoke the storage smart contract to transfer tokens from the blobber reward pool to a challenge pool; when the blobber later proves that it is providing storage, the tokens are paid from the challenge pool to the blobber. This transaction also serves to commit the blobber to the storage contents, so that the act of arranging payment also makes it possible to catch any cheating on the blobber's part.

File downloads work similarly: the client sends a signed read marker to a blobber as part of their request for data. The read marker authorizes the blobber to draw tokens from the blobber reward pool. Unlike with writes, the blobber receives the pay for providing reads immediately. An additional difference is that the client reading the data might not be the owner of the data.

The mining network will periodically challenge the blobber to provide randomly chosen blocks of that data. These challenges involve a carrot and stick approach; the blobber is punished if they fail the challenge but receive their token rewards when they pass the challenge.

A blobber must keep special write markers, which are signed commitments from the client as to the contents of the transaction. The client can request the write marker in order to verify the transaction contents, freeing the client from needing to store any data on its own system. Write markers also serve to track version information, and to authorize payment to the blobber. Writer marker contains a hash of the root of the file system, and hence the client's signature serves as the client's endorsement of the file system contents. Therefore, even though the blobber and client do not necessarily trust each other, their agreement to the file system's expected contents is publicly verifiable.

Users interact using crypto keys with a blockchain. Since the crypto currency balance is maintained against these keys, it's very important to protect the private key. In one embodiment Boneh-Lynn-Shacham (BLS) signatures are used to provide additional security by providing a mechanism to split the original key into two secondary keys and storing each of the secondary key on a different device. Signing requires individual signatures from each device. Hence, losing any one device can still protect the primary key. In addition, optionally one of the secondary key can further be split into two parts only one of which is stored on the device and the other is a simple PIN that the user has to enter each time. This provides an extra layer of protection in case both devices are compromised. In this scheme, it is easy to generate as many split keys as desired providing the ability for the user to periodically rotate the split keys and in the process change the PIN.

Agreement Negotiation. The client and blobber must negotiate a price for writes and a price for reads, both in terms of tokens/gigabyte of data. Other criteria may be negotiated between the client and blobber as needed, allowing the blockchain to serve as a public record of their agreement. Once terms have been established, the client writes a transaction to the blockchain with the terms of their agreement. We refer to this transaction as the storage agreement transaction.

This transaction includes: The id of the client (client_id). The id of the blobber (blobber_id). The allocation_id identifying this storage allocation, referring to the data that the blobber stores for the client. This globally unique ID is a function of client_id, blobber_id, and a timestamp. The tokens of reward paid to the miner per gigabyte read (read_price). The tokens of reward paid to the miner per gigabyte uploaded (write_price). A params field for any additional requirements. The signatures of both the client and blobber. Offer expiration time, to ensure that the client does not invoke an old agreement that is no longer profitable for the blobber. Storage duration, determining how long the blobber needs to provide storage. After this period has elapsed, the blobber no longer needs to store the client's files; of course, the client and blobber can negotiate to extend the storage period. From the perspective of the blockchain, the renewal is treated as a completely new agreement and no special support is needed. The client can generate a write marker to pay the blobber for files that the blobber is already storing.

This transaction also initializes a read_counter and write_counter for the client and blobber to use in their interactions, both initially set to 0. These values increase with each transaction depending on the amount of data uploaded or downloaded. By calculating the last counter value with the new counter value, the amount of reward the blobber has earned is determined easily.

This transaction also creates two new pools: 1) The blobber reward pool, containing the interest that the client generated as the rewards for the blobber to store and serve data. 2) The challenge pool; when the blobber verifies that it is storing the data, it may receive some portion of the rewarded in this pool.

When the funds in the blobber reward pool are depleted, the client may lock additional tokens to add funds to them. The challenge pool is initially empty, but gains tokens with every write that the client does. (Reads, in contrast, are paid to the blobber directly.)

In the storage contract transaction, the client locks tokens and pays the interest to the blobber reward pool. These tokens represent the blobber's pay for storing the client's data. A portion of these funds are allocated for the validators. Blobbers are paid far every file uploaded, and they are expected to store the files until the end of the contract period negotiated with the client. (A client can elect to delete files stored with the blobber but does not receive any refund for doing so). Note that they are not paid immediately. The funds are set aside in the challenge pool; the blobber receives tokens from this pool upon satisfying a challenge to prove that they are actually storing the data.

Challenge protocol. In order to verify that a blobber is actually storing the data that they claim they store, our protocol relies on the miners periodically issuing challenge requests to the blobbers. This mechanism is also how blobbers are rewarded for storing files, even if the files are not accessed by any clients. When the blobber passes the challenge, they receive newly minted tokens.

The actual verification is done by a group of machines called the validators. The validators can be any group of machines, depending on what makes sense in the blockchain ecosystem. Validators are mutually untrusting. In this discussion, we will assume that the validators are a distinct group of machines from the miners and blobbers.

At a high level, the challenge protocol involves three phases: 1) The mining network randomly selects the blobber data allocation to be challenged. This process also specifies the validators who will verify the challenge and provides a random seed to be used for the challenges. We refer to this stage as the challenge issuance. 2) In the justification phase, the blobber broadcasts the data to the validators along with the metadata needed to verify the challenge. 3) Finally, in the judgment phase, the validators share their results. Once the validators have agreed on the results of the challenge, they write a transaction to the blockchain indicating whether the test passed. This transaction also pays the validators and rewards the blobber.

Selecting validators is a particular challenge. In a cronyism attack, a blobber sends the data to a friendly validator who approves all challenges without validating the data. In an extortion attack, a validator demands additional compensation from the blobber in exchange for passing the challenge.

We defend against these attacks by having the mining network randomly select a set of V validators. For a challenge to pass, at least N miners must approve the results of the challenge. The difference between these values must be narrow enough to make a successful cronyism attack unlikely, but high enough to prevent an extortion attack. An additional concern is that the validators actually do the verification work. We refer to a validator who does not do the work but who attempts to collect the reward as a freeloader.

Challenge Issuance Phase: The mining network must initially post a transaction to the network randomly challenging a blobber providing storage. This transaction must include: The allocation of data challenged, identified by allocation_id. Note that this should implicitly identify which blobber is challenged. The list of eligible validators. A random seed, which determines the indices of the data blocks in that allocation that the blobber must provide. The latest write marker at the time of the challenge.

Conceptually, we can envision this challenge as a roulette wheel, where the number of tokens currently due to the blobber from its challenge pool dictates its number of slices on the wheel. (An alternate approach would be to use the size of the data allocation instead, but this can lead to a subtle attack. A blobber could post an agreement for a negligible price with itself as the client, and then commit to storing large amounts of easily regenerated data. With a commitment to a large enough amount of data, other blobbers would be challenged only with a low probability. By tying the probability of being challenged to the amount of tokens in the challenge pool, we make this attack prohibitively expensive to carry out.)

The initial transaction essentially locks a portion of the blobber's stake and reward in a sub-pool specific to this challenge. We follow a "guilty until proven innocent" approach, which prevents a blobber from attempting a denial-of-service attack against a validator in order to avoid punishment. If the blobber never satisfies the challenge, the tokens are effectively burned.

Justification Phase: When the blobber observes the challenge issuance on the blockchain, it broadcasts its proof of storage to the validators with: The file system metadata. The write marker proving that file system contents match what is stored on the blockchain. The challenged blocks of data, chosen pseudorandomly using the miner's random seed. The Merkle paths of those data blocks.

Once the validators receive the blobber's data, they each verify the data that they have been sent. The validator verifies that: The file system metadata is valid. The file system root hash matches the write marker. The write marker matches the most recent commitment to the blockchain. At this point, the validator has established that the blobber's metadata is valid and matches the blockchain. The validator then calculates the number of blocks on the system from the allocation size. Using the random seed, the validator verifies that the blobber's blocks correspond with the pseudorandom sequence. (This serves to make every block of data on the system equally likely to be challenged, and ensures that the blobber did not try to game the results).

For each data block, the blobber verifies that the Merkle path matches up to the file metadata. As part of this process, the validator stores the two penultimate hashes of the Merkle tree; that is, it stores the two hashes that can be hashed together to give the file's Merkle root. We refer to these hashes as the validation proof.

At most one of the hashes in the validation proof should have been provided by the blobber. (To ensure this behavior, the inclusion of additional hashes on the Merkle path is an automatic failure.) Therefore, the validator must have done the work to calculate at least one of the two hashes. This validation proof can be verified easily by the other validators. These proofs are an important part of our defense against freeloaders.

Judgment Phase: After the validator has completed its work, it broadcasts the signed hash of its results. We refer to this signed hash as the pre-commit. The hash format is H=hash (validationProof List, R), where validationProof list is a list of the hash pairs serving as validation proofs for each file, and R is a randomly chosen nonce selected by the validator.

The validator then waits to collect the pre-commits for the other validators. Once the timeout period has been reached, it broadcasts its validProof List and its R value to publish its results. No additional pre-commits are accepted at this point. (If less than the minimum number of required signatures is received, it will rebroadcast and wait again).

The validator accepts the signatures of all other validators with valid proofs. provided that the other validators submitted valid pre-commits. Since the results are not publicly observable until after the results are completed, a freeloader is not able to provide a valid pre-commit. Each validator submits a transaction to the blockchain with its results. The smart contract accepts the first transaction it receives, and only the first. At this point, the blobber receives its reward and the validators receive payment for their work. The payout amount is pro-rated to match the total payout and the length of the contract. For instance, if blobber Bob's challenge pool contains 12 tokens from Alice for her storage paid over a contract period of 90 days, and the first challenge happens at day 45, Bob will receive 6 tokens for passing the challenge. If Bob is again challenged at day 60, he will receive an additional 2 tokens. On day 90, he will receive the remaining balance of 4 tokens.

The validators are paid in a pro-rated manner similar to how the blobber is rewarded. An equal portion of the reward is set aside for every validator, even those that did not participate in the validation. However, the rewards are only distributed to validators who participated in the validation process; the reward for non-participating validators is burned. This design ensures that validators have no incentive to exclude each other, but have a strong incentive to perform the validation work.

Challenge Failures: With the challenge protocol, we are concerned that blobbers could be the victim of a denial-of-service attack when they are challenged. An attacker interested in damaging the network could target challenged blobbers, potentially destroying the blobbers' rewards and staked tokens, until no blobbers are willing to provide the service.

As a result, there is no time-out period for challenges. The blobber could contact the validators to complete the challenge at any time. This choice creates a misalignment of incentives, since validators are only paid on successful challenges, and hence might be motivated to collude with a cheating blobber. To address this concern, we allow blobbers to broadcast a signed confession indicating that they are unable to satisfy the challenge. The validators can then write this message to the blockchain and receive their rewards for their validation work. This transaction releases a portion of the blobber's stake back to them. The client owning the data then receives back the token rewards and the rest of the challenged blobber's stake. With this design, a blobber caught cheating that acts in its own best interests will reward the other parties in the system.

Challenge Protocol Experimental Results. In order to validate the effectiveness of our challenge protocol and help determine the optimal settings, we ran experiments to determine the number of challenges needed to identify a cheater. We simulate a blobber requesting a single block of data from a single file. Via information gained from the blockchain and the signed write marker, the validator knows the number of blocks in the file and the Merkle root of the file. We simulate a blobber that attempts to cheat by not storing all blocks of data. Each setting was tested with 21 rounds (in order to simplify calculation of the median).

FIG. 10 shows our results for a blobber that is expected to store a 32-block file, but who only stores a smaller number of blocks (column 1). Our results show that a blobber failing to store small amounts of data might be able to evade detection for several challenges (requiring a median 27 challenges if they stored all but 1 block of the data). However, as their cheating increases fewer and fewer challenges are needed.

Different embodiments described herein include components or structures to perform the described functionality. A "component" or a "module" as used in this invention disclosure, includes a dedicated or shared processor and, typically, firmware or software modules executed by the processor. Depending upon implementation-specific or other considerations, a module can be centralized or its functionality distributed. A component or a module can include special purpose hardware, firmware, or software embodied in a computer-readable medium for execution by the processor.

In one embodiment, FIG. 1 depicts a diagram 100 illustrating an example of a blockchain for transaction rewards on token locking. In the example of FIG. 1, the environment includes a first client system 110-1 through an nth client system 110-n, network 140, miner system 120-1 through an nth miner system 120-n, blobber system 130-1 through an nth blobber system 130-n and sharder system 150-1 through nth sharder system 150-n. In an implementation, the client system 110 includes components to request different transactions using tokens. In one implementation, the client system 110 includes modules to buy tokens, lock tokens, earn interest tokens and spend tokens. A client can implement many types of flexible and distributed applications on the client system 110 using the client aspect of the blockchain.

In one implementation, the miner 120 includes components to process requests for mining. Two or more miners form a mining network. Miners mine the blockchain for new tokens. In one embodiment, the miner generates interest tokens in response to locked tokens in a pool.

In one implementation, the blobber 130 includes components to fulfill transaction requests that are initiated by the client 110 and approved by miner 120. In one embodiment, the blobber fulfills storage requests. In one implementation, the sharder 150 includes components to provide long-term service to the blockchain. For example, the sharder 150 may assist a blobber for providing long-term storage. In another example, the sharder may provide actions that help the blockchain community.

Network 140 can be different wireless and wired networks available to connect different computer devices including client and server systems. In an implementation, network 140 is publicly accessible on the internet. In an implementation, network 140 is inside a secure corporate wide area network. In an implementation, network 140 allows connectivity of different systems and devices using a computer-readable medium. In an implementation, the block chain platform using a message flow model allows users on the client system, the blobber, the sharder or the miner to set privacy settings that allow data to be shared among select family and friends, but the same data is not accessible to the public. In an implementation, the block chain platform using a message flow model allows users on the client system, the blobber, the sharder or the miner to encrypt data to be shared among select family and friends, but the same data while available cannot be decoded by the public.

The messaging and notification between different components can be implemented using application programming interface (API) calls, extensible markup language ("XML") interfaces between different interfaces, Java/C++ object oriented programming or simple web-based tools. Different components may also implement authentication and encryption to keep the data and the requests secure.

Figure 2:
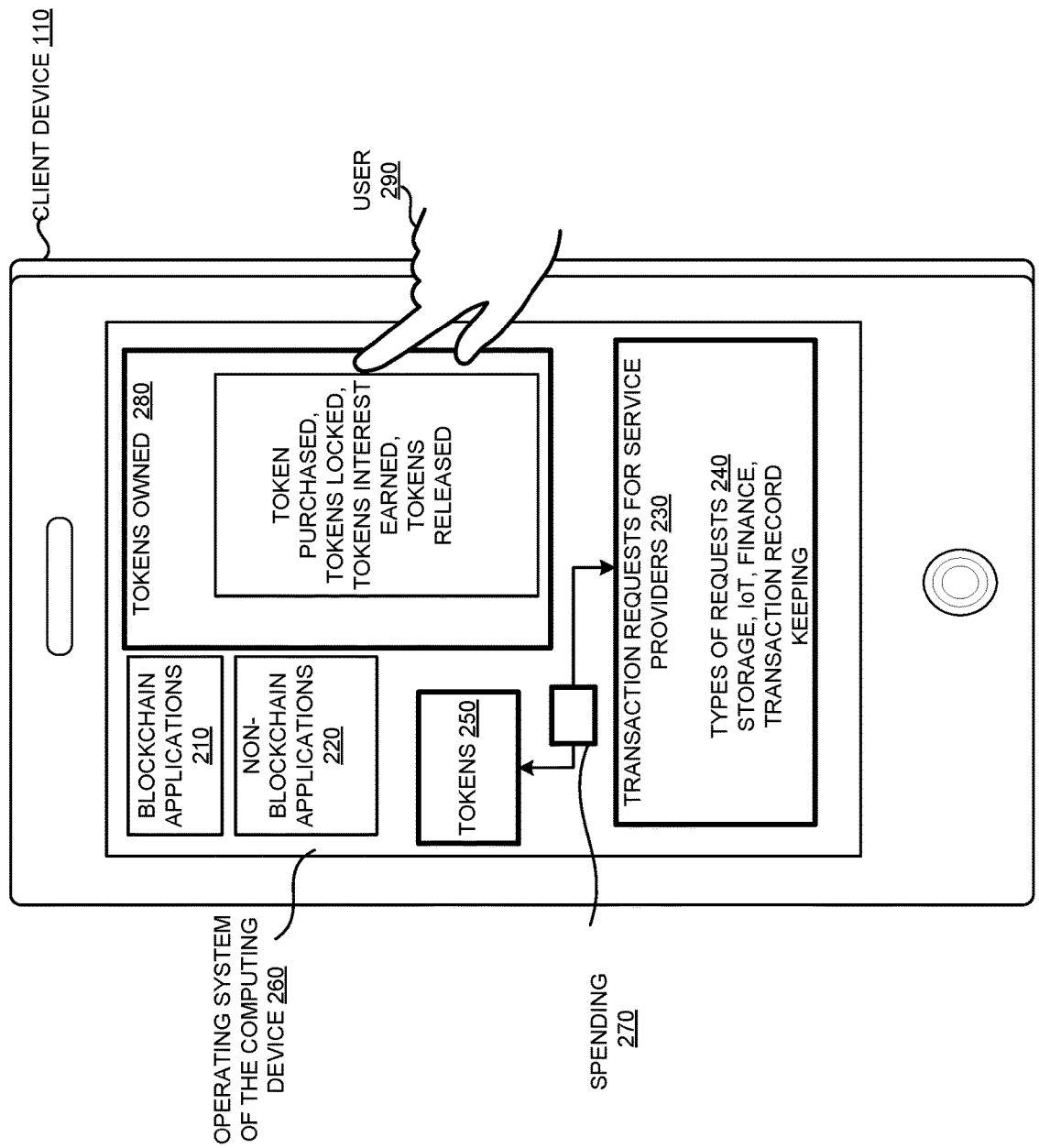
FIG. 2 shows an exploded view of a client computing system illustrating different subroutines, according to one embodiment.

FIG. 2 is an exploded view of a client system 110 shown in FIG. 1. For a blockchain for transaction rewards on token locking, the client has a blockchain applications 210 that interacts with the operating system 260 of the client computing device. For example, the client computing device may have family photos, videos or business-related files for storage that use a blockchain distributed storage application. The client may also use non-blockchain applications 220. The client may use transactions for a blockchain based or non-blockchain based applications to work seamlessly with the token locking system. The client gets authorized tokens 250 for different services on the blockchain platform. The token preferences for the client are coordinated using spending module 270. A client's transaction requests for service providers 230 include requests to different miners, blobbers or sharders. Different types of requests 240 may include storage, IoT, Finance, transaction record keeping requests. The tokens owned 280 includes techniques to buy tokens, lock tokens, earn interest tokens and release locked tokens. A client may use one or more options in different types of combinations to preserve the value of its own token portfolio as well as engage with the blockchain to perform different transactions at a low-cost. A user 290 is shown using the client device 110.

Figure 3:
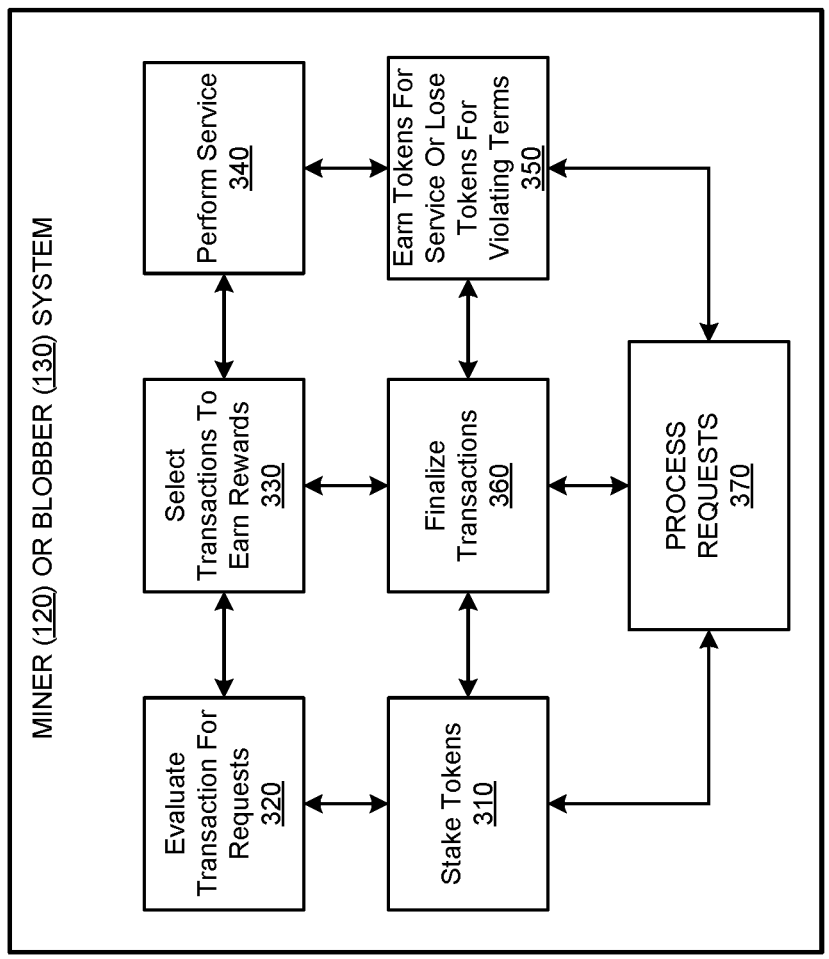
FIG. 3 is an exploded view of a miner or a blobber computing system illustrating different modules and functions, according to one embodiment.

FIG. 3 is an exploded view of a miner system 120 or blobber 130 of FIG. 1. The different components or modules included in a miner or blobber system includes a module to process requests 370, stake tokens 310, evaluate transactions appearing on the blockchain with service requests 320, select transactions to earn rewards 330, perform requested service 340, earn tokens for service or lose tokens for violating terms of service 350, and confirm transactions 360 on the blockchain platform. In one implementation, the miner system includes module to release tokens from the pool to reward blobbers, miners, sharders for their service. In one implementation, the blobber system includes module to evaluate the rewards earned on a transaction versus cost of servicing the transaction. In one embodiment, the miner and blobber negotiate the rewards earned for their service with the blockchain or a given client requesting a transaction.

Figure 4:
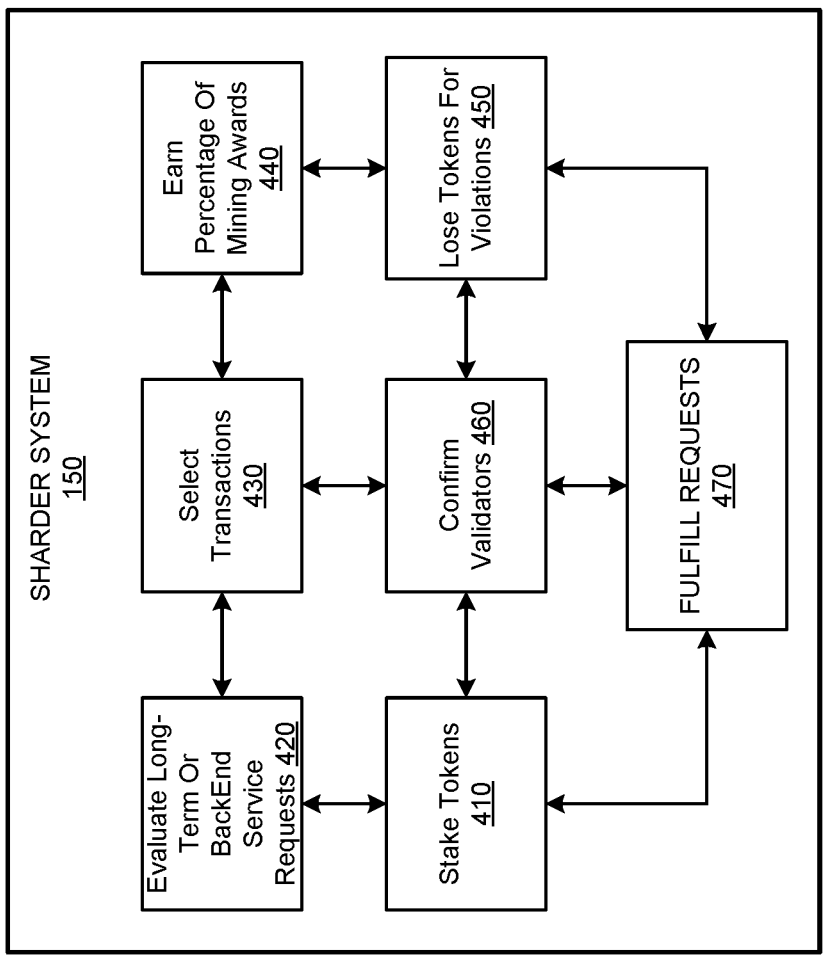
FIG. 4 is an exploded view of a sharder computing system illustrating different modules and functions, according to one embodiment.

FIG. 4 is an exploded view of a sharder system 150 of FIG. 1. The different components or modules included in a sharder system includes a module to fulfill requests 470, stake tokens 410, evaluate long term or backend service requests 420, select transactions for providing service 430, earn percentage of mining awards 440, lose tokens for violations 450, confirm validators 460. In one implementation, the sharder system includes modules to provide community service to the blockchain that are rewarded as a percentage from the mining pool not associated with a given transaction.

Figure 5:
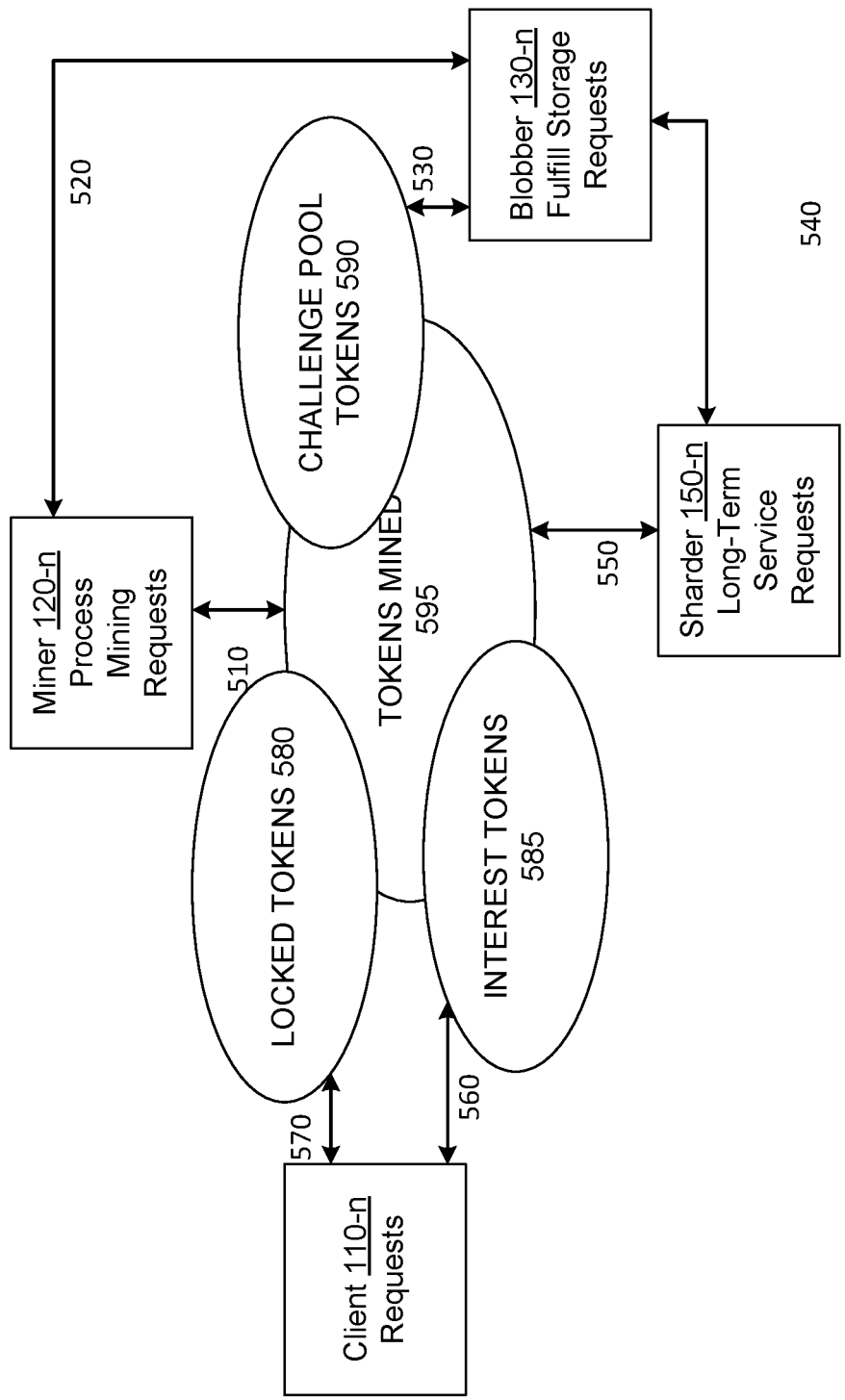
FIG. 5 shows the token flow between different pools and entities in a blockchain platform, according to one embodiment.

FIG. 5 shows the token flow between different entities on the blockchain. The message 510 is a request and acknowledge between miner 120 and the mining pool 595. The message 520 is a response to a client request 510 to allocate a blobber 130 to handle the client request in 510 and exchanges between miner and a blobber for a given transaction. The message 530 is the bidirectional message between the blobber and the challenge pool 590 that are tokens released once a blobber fulfills a challenge request or a service. The message 540 are bidirectional exchanges between a sharder 150 and a blobber assisting a blobber for long-term service requests. The message 550 shows the sharder earning a percentage of the mining rewards pool for its long-term services. The message 560 shows client 110 earning interest tokens from the interest tokens pool 585 on locking the tokens in the locked tokens pool 580 shown in message 570.

Figure 6:
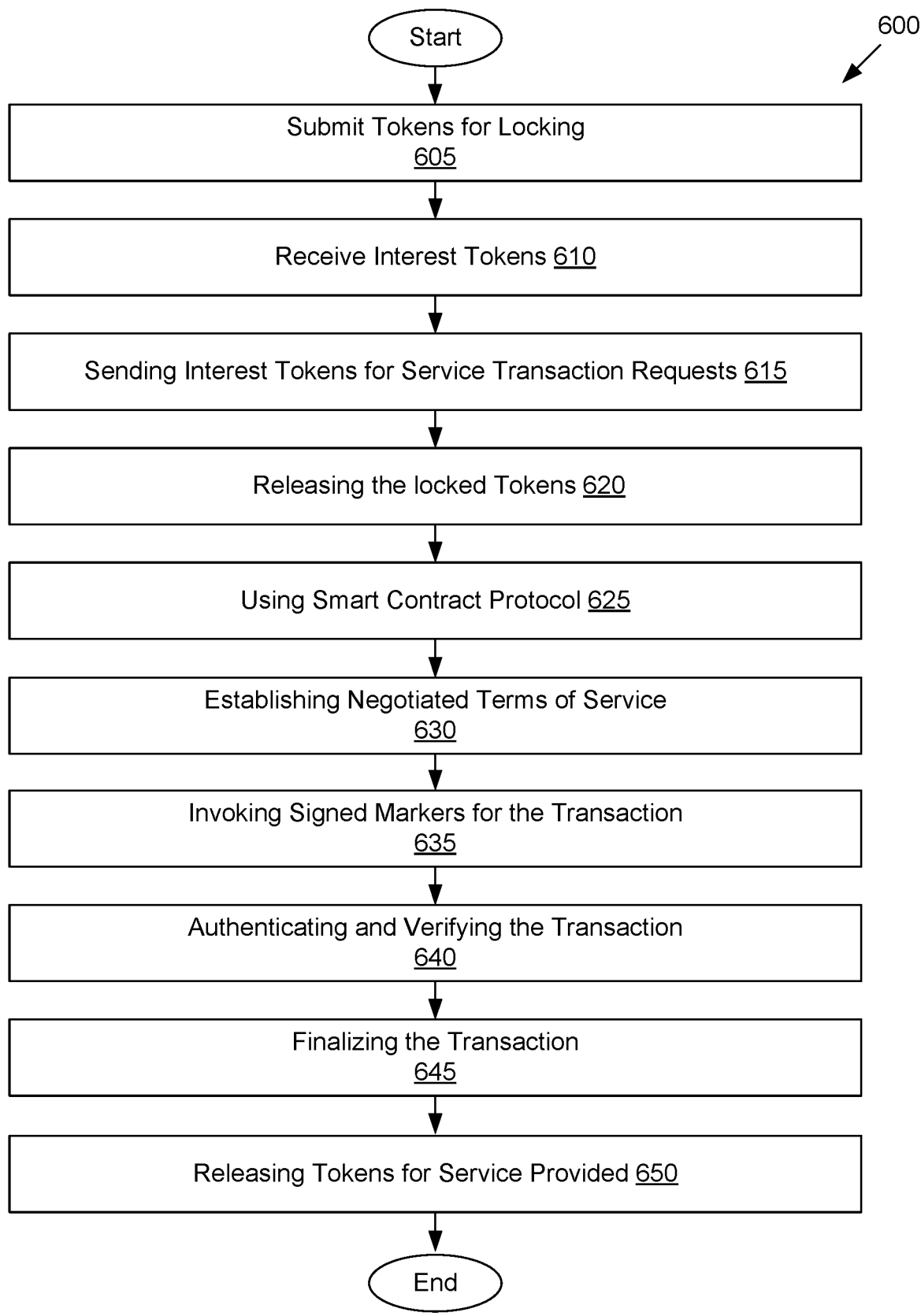
FIG. 6 shows a flowchart illustrating an example of a method of transaction rewards on token locking.

FIG. 6 depicts a flowchart 600 illustrating an example of a method for a blockchain platform for transaction rewards on token locking. The flowchart 600 is discussed in conjunction with the blockchain platform environment shown in the diagram 100 in FIG. 1. At block 605, a client submits tokens for locking to the locked tokens pool. At block 610, the client receives interest tokens for the locked tokens. At 615, the client is free to send the interest tokens for service transaction requests. At 620, depending on whether the transaction is finalized or rejected by the service providers, the client can release the locked tokens after expiry of the given period of time. At 625, the blockchain uses smart contract protocol to finalize the transaction. At 630, the negotiated terms of service are established. At 635, signed markers are used to validate the transaction contents. At 640, all the entities involved are authenticated and verified. At 645, the transaction is finalized. At 650, the rewards tokens from the pool are sent to the service providers.

In broad embodiment, the invention is systems and methods of a blockchain platform for transaction rewards on token locking incentivizing clients to engage in transactions with service requests and rewarding the service providers fairly while avoiding congestion of network resources and bandwidth.

Figure 7:
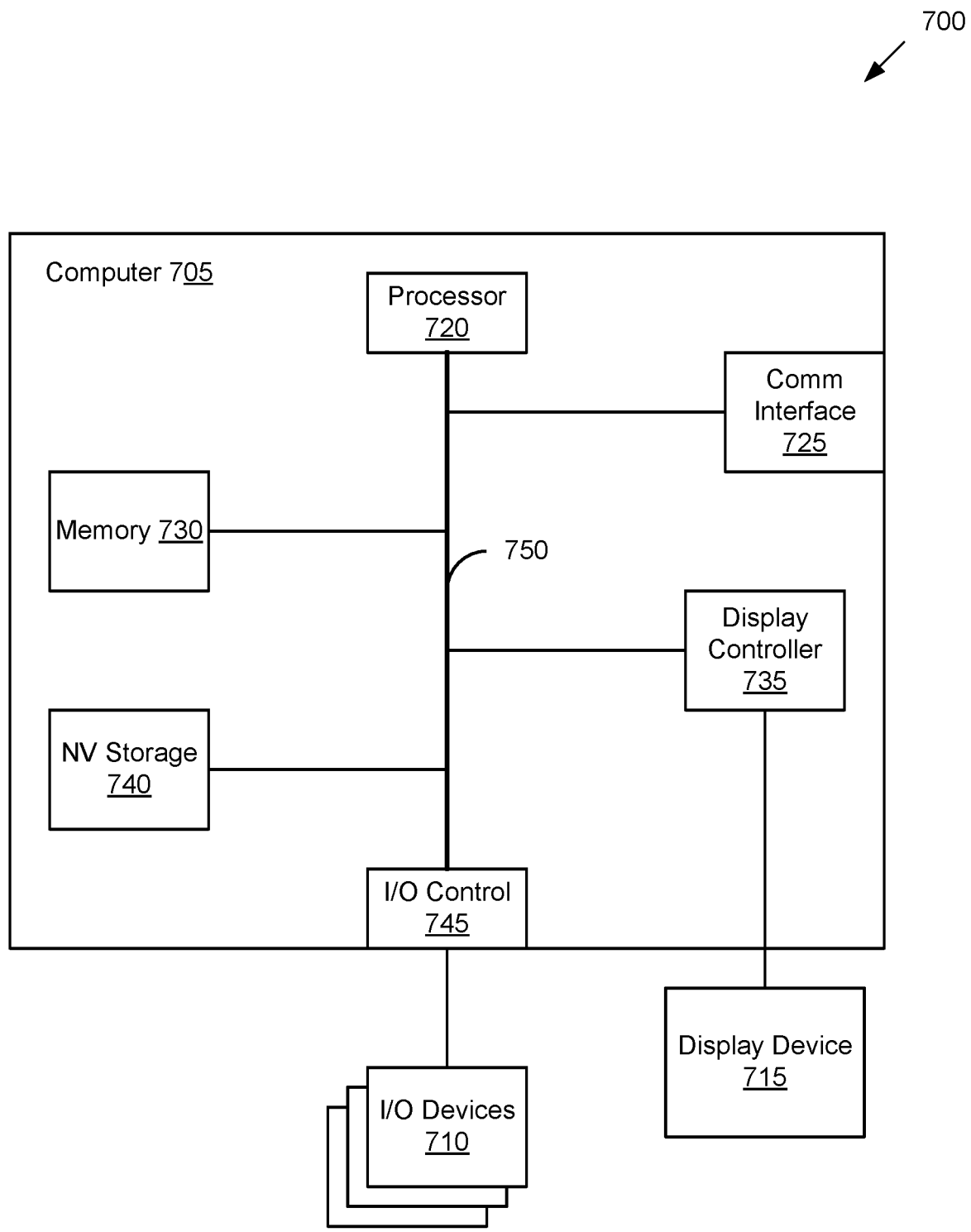
FIG. 7 is a schematic diagram of exemplary computing devices that can be used to implement the methods and systems disclosed herein, according to one embodiment.

FIG. 7 is a schematic diagram of computing device 700 that can be used to implement the methods and systems disclosed herein, according to one or more embodiments. FIG. 7 is a schematic of a computing device 700 that can be used to perform and/or implement any of the embodiments disclosed herein. In one or more embodiments, client system 110, a miner system 120 and/or blobber system 130 of FIG. 1 may be the computing device 700.

The computing device 700 may represent various forms of digital computers, such as laptops, desktops, workstations, personal digital assistants, servers, blade servers, mainframes, and/or other appropriate computers. The computing device 700 may represent various forms of mobile devices, such as smartphones, camera phones, personal digital assistants, cellular telephones, and other similar mobile devices. The components shown here, their connections, couples, and relationships, and their functions, are meant to be exemplary only, and are not meant to limit the embodiments described and/or claimed.

FIG. 7 shows an example of a computing device 700 on which techniques described here can be implemented. The computing device 700 can be a conventional computer system that can be used as a client computer system, such as a wireless client or a workstation, or a server computer system. The computing device 700 includes a computer 705, I/O devices 710, and a display device 715. The computer 705 includes a processor 720, a communications interface 725, memory 730, display controller 735, non-volatile storage 740, and I/O controller 745. The computer 705 may be coupled to or include the I/O devices 710 and display device 715.

The computer 705 interfaces to external systems through the communications interface 725, which may include a modem or network interface. It will be appreciated that the communications interface 725 can be considered to be part of the computing device 700 or a part of the computer 705. The communications interface 725 can be an analog modem, integrated services for digital networks ("ISDN") modem, cable modem, token ring interface, satellite transmission interface (e.g. "direct personal computer" also known as "direct PC"), or other interfaces for coupling a computer system to other computer systems.

The processor 720 may be, for example, a conventional microprocessor such as an Intel Pentium microprocessor or Motorola power PC microprocessor. The memory 730 is coupled to the processor 720 by a bus 750. The memory 730 can be Dynamic Random Access Memory (DRAM) and can also include Static RAM (SRAM). The bus 750 couples the processor 720 to the memory 730, also to the non-volatile storage 740, to the display controller 735, and to the I/O controller 745.

The I/O devices 710 can include a keyboard, disk drives, printers, a scanner, and other input and output devices, including a mouse or other pointing device. The display controller 735 may control in the conventional manner a display on the display device 715, which can be, for example, a cathode ray tube (CRT) or liquid crystal display (LCD). The display controller 735 and the I/O controller 745 can be implemented with conventional well-known technology.

The non-volatile storage 740 is often a magnetic hard disk, an optical disk, or another form of storage for large amounts of data. Some of this data is often written, by a direct memory access process, into memory 730 during execution of software in the computer 705. One of skill in the art will immediately recognize that the terms "machine-readable medium" or "computer-readable medium" includes any type of storage device that is accessible by the processor 720 and also encompasses a carrier wave that encodes a data signal.

The computing device 700 is one example of many possible computer systems that have different architectures. For example, personal computers based on an Intel microprocessor often have multiple buses, one of which can be an I/O bus for the peripherals and one that directly connects the processor 720 and the memory 730 (often referred to as a memory bus). The buses are connected together through bridge components that perform any necessary translation due to differing bus protocols.

Network computers are another type of computer system that can be used in conjunction with the teachings described here. Network computers do not usually include a hard disk or other mass storage, and the executable programs are loaded from a network connection into the memory 730 for execution by the processor 720. A Web TV system, which is known in the art, is also considered to be a computer system, but it may lack some of the components shown in FIG. 7, such as certain input or output devices. A typical computer system will usually include at least a processor, memory, and a bus coupling the memory to the processor.

Though FIG. 7 shows an example of the computing device 700, it is noted that the term "computer system," as used here, is intended to be construed broadly. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller. An example of a computer system is shown in FIG. 7.

The memory can include, by way of example but not limitation, random access memory (RAM), such as dynamic RAM (DRAM) and static RAM (SRAM). The memory can be local, remote, or distributed. As used here, the term "computer-readable storage medium" is intended to include only physical media, such as memory. As used here, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The bus can also couple the processor to the non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory here. Even when software is moved to the memory for execution, the processor will typically make use of hardware registers to store values associated with the software, and local cache that, ideally, serves to speed up execution. As used here, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. Interfaces enable computer systems and other devices to be coupled together in a network.

Several components described here, including clients, servers, and engines, can be compatible with or implemented using a cloud-based computing system. As used here, a cloud-based computing system is a system that provides computing resources, software, and/or information to client systems by maintaining centralized services and resources that the client systems can access over a communications interface, such as a network. The cloud-based computing system can involve a subscription for services or use a utility pricing model. Users can access the protocols of the cloud-based computing system through a web browser or other container application located on their client system.

The invention disclosure describes techniques that those of skill in the art can implement in numerous ways. For instance, those of skill in the art can implement the techniques described here using a process, an apparatus, a system, a composition of matter, a computer program product embodied on a computer-readable storage medium, and/or a processor, such as a processor configured to execute instructions stored on and/or provided by a memory coupled to the processor. Unless stated otherwise, a component such as a processor or a memory described as being configured to perform a task may be implemented as a general component that is configured to perform the task at a given time or a specific component that is manufactured to perform the task. As used here, the term 'processor' refers to one or more devices, circuits, and/or processing cores configured to process data, such as computer program instructions.

A detailed description of one or more implementations of the invention is provided here along with accompanying figures that illustrate the principles of the invention. The invention is described in connection with such implementations, but the invention is not limited to any implementation. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Techniques described here relate to apparatus for performing the operations. The apparatus can be specially constructed for the required purposes, or it can comprise a general-purpose computer selectively activated or reconfigured by a computer program stored in the computer. Such a computer program may be stored in a computer-readable storage medium, such as, but is not limited to, read-only memories (ROMs), random access memories (RAMS), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus. Although the foregoing implementations have been described in some detail for purposes of clarity of understanding, implementations are not necessarily limited to the details provided.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures.

The above-described functions and components may be comprised of instructions that are stored on a storage medium such as a computer readable medium. The instructions may be retrieved and executed by a processor. Some examples of instructions are software, program code, and firmware. Some examples of storage medium are memory devices, tapes, disks, integrated circuits, and servers. The instructions are operational when executed by the processor to direct the processor to operate in accord with some embodiments. Those skilled in the art are familiar with instructions, processor(s), and storage medium.

Figure 8:
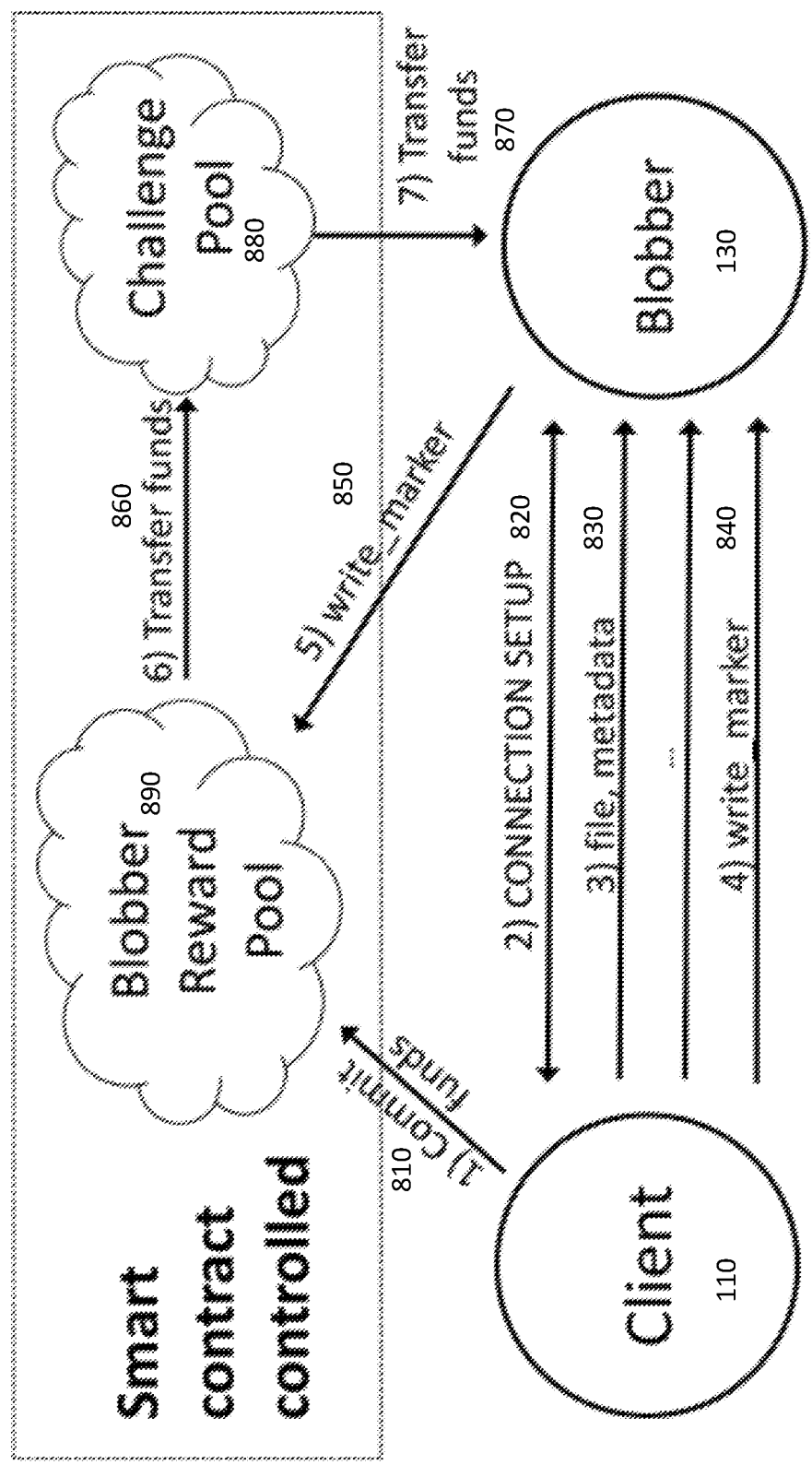
FIG. 8 gives the flow and exchange of messages in a smart contract controlled system for a storage transaction.

FIG. 8 shows an overview of the process for a client uploading file to a blobber. he steps are as follows: At 810, before uploading data to the blobber, the client must commit tokens to the blobber reward pool. At 820, the client and blobber set up a secure connection. At the time of this writing, our implementation relies on HTTPS. At 830, the client transfers files and the corresponding metadata. This step may be repeated until all files have been uploaded. At 840, the client uploads a signed write marker, which serves as the client's commitment to the file system contents. At 850, the blobber calls the storage smart contract to claim its reward. This call commits the blobber to the file system contents, and also stakes some of the blobber's tokens to guarantee its performance. At 860, a portion of the funds in the blobber reward pool are transferred to the challenge pool, according to the write price specified in the agreement.

At 870, sometime later, the blobber is challenged to prove that the files are stored correctly. If the challenge is successful, the blobber receives a portion of the tokens in the challenge pool. This process is repeated until the end of the storage agreement. At 850, the blobber's mechanism to get paid (by writing a transaction in step 5) also commits the blobber to the contents of the file system; the challenge protocol can then detect if the files are not actually stored on the system.

Blobber Reward Pool: Step 1 in FIG. 1 allows the client to allocate funds for storing or reading data from the blobber. Typically, this step is done during the contract negotiation, though the client may decide to lock additional tokens to replenish this pool when it has been depleted.

The blobber can verify the funds in this pool and may refuse to accept data if the client does not have sufficient tokens locked in this pool. Note that the blobber is not directly paid for writes by this pool. Instead, the funds are payable to the challenge pool. The blobber will receive any funds sent to this pool but must periodically prove possession of the file system contents to earn these tokens.

It is possible that the tokens in the blobber reward pool are not used by the client before the negotiated end of the terms of service. Once the terms of service have expired, any tokens remaining in this pool are transferred to the client. The client may also write a special cancellation transaction to end the terms of the contract early; the blobber reward pool is then emptied out, with all tokens transferred to the client. This mechanism gives the client an escape in case the blobber fails to live up to the terms of service.

We note that the client could abuse this cancellation mechanism in order to cheat the blobber, though the attack is unlikely to be very profitable for storage. A blobber does not commit the client's uploaded file contents until payment has been accepted by the blockchain. On reads, cancellation would mean that the data could no longer be read, making the benefit of this attack very questionable.

Challenge Pool: When the blobber writes a transaction (in step 5 of FIG. 1), funds are transferred from the blobber reward pool to the challenge pool. The amount of tokens transferred is dictated by the write marker, which includes the amount of data uploaded, and the negotiated write price stored in the agreement.

Funds in this pool are paid out to the blobber during the challenge protocol. Once the terms of service have elapsed, and the blobber is no longer required to store the data, any remaining funds are paid to the blobber. (Note, however, that any funds connected to unsatisfied challenges are not released; this design prevents a blobber from "running out the clock" to avoid passing a challenge). A small portion of the tokens in the challenge reward pool is set aside for the validators, a separate group of machines who verify that the blobber is providing the storage that it claims to be providing.

The transfer to the challenge pool also stakes some of the blobber's own tokens. The blobber earns the interest on the staked tokens, but runs the risk that the staked tokens could be burned if any challenges are failed.

Nonetheless, we anticipate that our design may be useful for other services. We address the timing issues that arise by delaying the unlocking of funds for 24 hours. In that time, the blobber may redeem any outstanding markers for its rewards as per normal operation.

Write Markers: Write markers serve as the client's commitment to the file system contents, the blobber's proof of storing data required by the client, and a "cashier's check" which the blobber can redeem to get paid. A write marker contains: The client id, blobber id, and allocation id; A timestamp, to ensure freshness; file_root, the hash of the root directory on the file system; prev_file_root, used for versioning; write_counter, which serves to give the total size to date of the data that the client has uploaded to the blobber for this allocation; The signature of the client owner verifying the other fields in this marker.

The client will not send any additional write markers until the latest write marker has been committed to the blockchain. We note that the client might refuse to upload the write marker after uploading data. In this case, the blobber will simply discard the data after a timeout period.

Levels of Trust: The protocol that we have detailed assumes no trust between the client and blobber. However, if the client and blobber have an established relationship they might elect to use a more relaxed trust mode.

Normally, a client will not send additional write markers until the blobber has redeemed the previous write marker. However, the client can relax this requirement and send write markers before older markers have been redeemed, which allows for more graceful recovery should the client crash while uploading data. This approach risks that the blobber then delay redeeming markers until near the agreement's expiration, in the hopes of avoiding being identified as a cheater. Gradations of this trust might be used as well; for instance, a client might send multiple write markers during an active session, but not start a new session until all markers from the previous session have been redeemed.

Read Markers. Similar to write markers, read markers are used for clients to pay blobbers for their work off chain. The blobbers can redeem these markers on the blockchain. A read marker contains: a) the client_id of the client requesting the data to ensure the client is authorized, b) the client_id of the owner of the data, c) the blobber_id and allocation_id. d) timestamp (to ensure freshness), e) the path of the file being read, used to verify that the client is authorized to read the file, f) the data block range of the blocks of the file that the client requests. g) read_counter, giving the size of all data read to data h) the client's signature of the other content of the read marker.

For reads, the blobber smart contract will release funds corresponding to the difference between the read_counter in the marker and the latest read_counter redeemed on the blockchain.

Authorization tickets allow the owner of data to share it with other clients. The ticket includes: 1) the owner ID, blobber ID, client ID, and allocation ID, 2) The expiration time (expiration), 3) The amount of data that can be downloaded (max_data), 4) The path of files that the client can download (optional), 5) The owner's signature, 6) The storage smart contract only accepts read markers that match with the terms given by the authorization ticket.

In a yet more relaxed model, the client might avoid validation of storage altogether. With this approach, the funds in the blobber reward pool are made directly payable to the blobber, and the challenge protocol is not performed. The advantage of this setup is that no funds need to be allocated for the validators, and hence the blobber might offer the service more cheaply. However, if the blobber fails to live up to their terms, the client has no recourse. The blobber's cheating is still publicly verifiable, but with no incentive for the validators and no staked funds from the blobber, the blobber will suffer no consequences. This trust model is only appropriate if the client and blobber have a well-established relationship.

Figure 9:
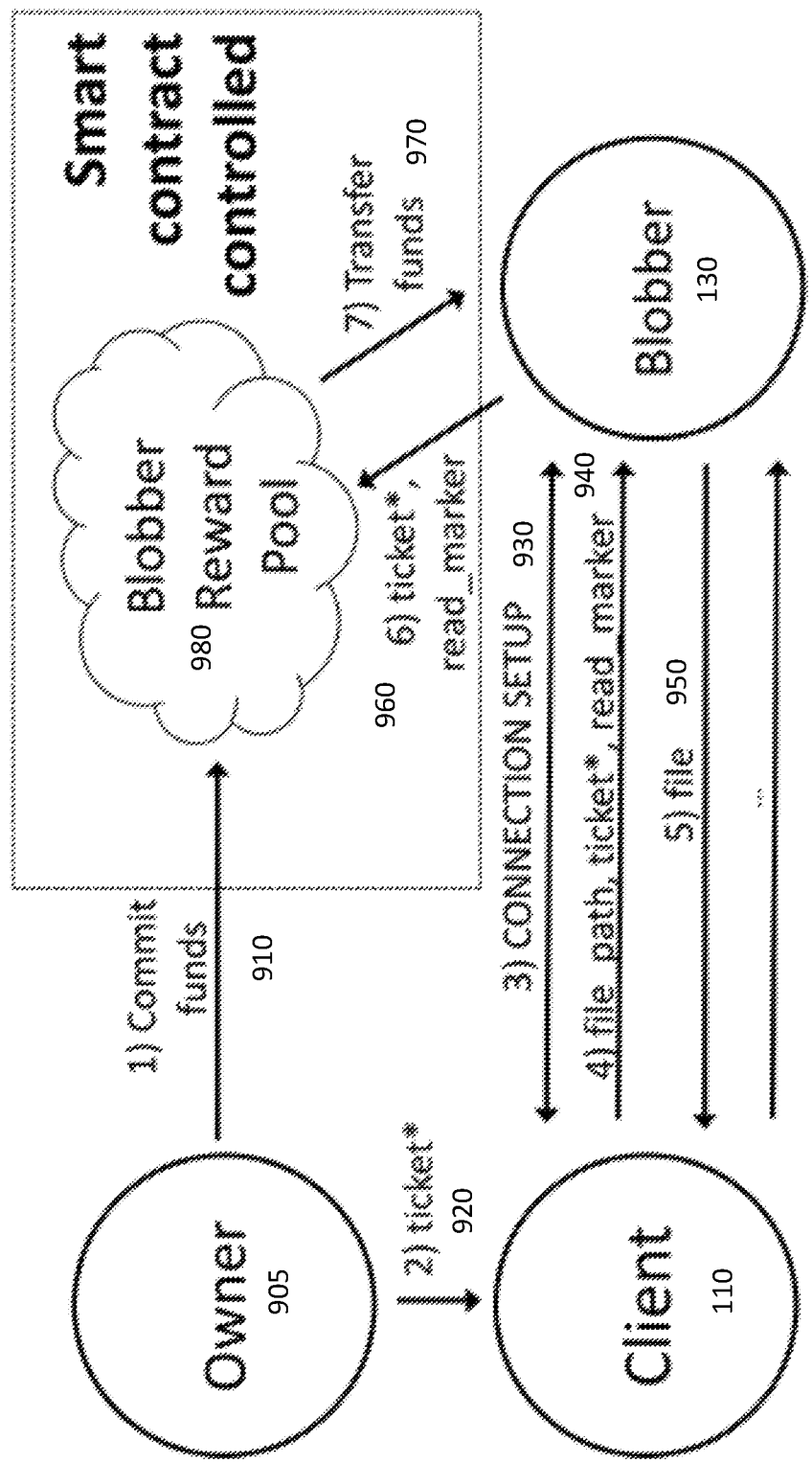
FIG. 9 gives the flow and exchange of messages in a smart contract controlled system for a storage read transaction.

Pay for Reads. The storage contract transaction includes a negotiated read price. However, unlike with writes, the client reading the data might not be the owner of the data. FIG. 9 shows the process for a client reading previously uploaded data from the blobber. The steps are as follows: At 910, before uploading data to the blobber, the owner must commit tokens to the blobber reward pool. At 920, the owner of the data gives the client reading the data an authorization ticket permitting the read. At 930, the client and blobber set up a secure connection. At 940, the client requests a file and sends a signed read marker. If the client is not the owner of the data, the client must also include a "ticket" authorizing the read. At 950, the blobber responds with the requested file. (Step 4 and step 5 may be repeated for different files.) At 960, the blobber calls the smart contract once the reads are completed, including the read marker and the ticket (if the client is not the owner). The smart contract validates the read marker and checks the authorization ticket (if required); if the read is valid, the smart contract authorizes the release of the owner's funds stored in the blobber reward pool. At 970, the smart contract releases tokens from the blobber reward pool and rewards the blobber for the work performed.

In the request for data, the client must send a signed read marker, authorizing the blobber to draw rewards from the blobber reward pool. This process is similar to how writes are rewarded, except that the blobber is paid directly, rather than having those tokens transferred to a challenge pool. We note that a blobber might redeem the read markers without providing the data. However, the client will stop providing read markers if the blobber is not providing service. Our design permits data owners to pay for other clients to read their data; The authorization ticket (signed by the owner) grants the client the authority to read data, but also specifies any desired restrictions. The authorization tickets prevent a blobber from reading the data as a mechanism to drain the blobber reward pool.

Read Markers: Similar to write markers, read markers are used for clients to pay blobbers for their work off chain. The blobbers can redeem these markers on the blockchain. A read marker contains: The client_id of the client requesting the data. This field ensures that the client is authorized to read the data; The client_id of the owner of the data; The blobber_id and allocation_id; timestamp, to ensure freshness; The path of the file being read, used to verify that the client is authorized to read the file; The data block range of the blocks of the file that the client requests; read_counter, giving the size of all data read to data; The client's signature of the other content of the read marker. Unlike with write markers, the blobber is not expected to store the read markers after redeeming them. Also, many read markers may be redeemed by cashing in the latest read marker. The smart contract will release funds corresponding to the difference between the read_counter in the marker and the latest read_counter redeemed on the blockchain.

Authorization Tickets: Authorization tickets allow the owner of data to share it with other clients, and to pay for their reads. It also specifies the restrictions on the client's ability to read data. The ticket includes: The owner ID, blobber ID, client ID, and allocation ID; The expiration time (expiration); The amount of data that can be downloaded (max_data); The path of files that the client can download (optional); The owner's signature.

The storage smart contract only accepts read markers that match with the terms given by the authorization ticket. The expiration field ensures that the client does not use the ticket indefinitely; the smart contract will not accept read markers after this point. The max_data field specifies the maximum data that can be downloaded during the specified period of time.

Lastly, the owner can limit the client's access to a whitelisted subset of files. However, this last restriction depends on the blobber and client not colluding. Otherwise, the client can generate a read marker for a different file as a way of paying the blobber to provide restricted content.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

A detailed description of one or more implementations of the invention is provided here along with accompanying figures that illustrate the principles of the invention. The invention is described in connection with such implementations, but the invention is not limited to any implementation. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The structures and modules in the figures may be shown as distinct and communicating with only a few specific structures and not others. The structures may be merged with each other, may perform overlapping functions, and may communicate with other structures not shown to be connected in the figures.

The invention claimed is:

1. A method on a blockchain platform for separating roles of service providers in a distributed environment while performing a service according to a blockchain protocol, comprising:

negotiating a smart contract between a client and one or more service providers to establish a payment in tokens with an agreed write price from the client to the service providers for executing a plurality of transactions to perform the service wherein the service providers are one or more blobbers;

issuing a storage agreement transaction between the blobber and the client by the client to the blockchain platform;

locking one or more client tokens by the client for a limited period of time as defined by the negotiated smart contract;

receiving interest tokens by the client responsive to the locking of the client tokens using a multiplier, wherein the interest tokens are the blobber's pay based on the negotiated smart contract;

creating a blobber reward pool and a challenge pool based on the received interest tokens wherein a portion from the blobber reward pool is allocated for one or more validators who are responsible for verifying a challenge and the one or more blobbers receive tokens from the challenge pool for satisfying a challenge out of the challenge pool;

transferring data in a form of files and metadata, by the client, to the blobbers;

responsive to the transferring data, based on an amount of the transferred data, transferring selected blobber token rewards from the blobber reward pool to the blobber challenge pool;

issuing a signed write-marker, by the client, indicating a confirmation from the client as to the transferred data;

receiving the files to write by the blobber;

writing the files to a non-volatile storage medium by the blobbers;

issuing a write completion transaction by the blobber;

receiving by the blobber a random write verification challenge from the blockchain platform wherein the random write verification challenge includes a randomly selected blobber data allocation, a number of validators randomly selected, a random seed which determines indices of data blocks in the randomly selected blobber data allocation subsequent to the issuing of the write completion transaction;

in response to receiving the random write verification challenge, broadcasting to the validators, by the blobber, data including a file system metadata, a latest write marker, challenge blocks chosen pseudorandomly using the random seed, and at least one out of two penultimate hashes of a Merkle tree;

in response to receiving the broadcasted data by the validators, validating the received broadcasted data by initiating a validation proof process through which the validators verify the selected blobber data allocation that the blobber must supply, the latest write marker, the file system metadata is valid, a file system root hash matches the latest write marker, and the latest write marker matches a most recent commitment to the blockchain;

utilizing the random seed, the validators verify the challenge blocks chosen pseudorandomly;

verifying the Merkle tree matches up to the file metadata;

storing two penultimate hashes comprising the blobber provided at least one out of the two penultimate hashes of the Merkle tree and a validator calculates a remaining penultimate hash value out of the at least one out of the two penultimate hashes of the Merkle tree using the file system metadata, wherein the two penultimate hashes of the Merkle tree are hashed together to give the Merkle root of the randomly selected blobber data allocation;

broadcasting by the validators precommit signed hashes of the two penultimate hashes to the blockchain platform;

receiving the broadcasted validators precommit signed hashes;

determine a combined validation result wherein the combined validation result is based on a validated count, a not validated count, and a predetermined accepted validated count out of the number of validators;

sending the combined validation result to the smart contract;

accepting by the smart contract a first received validation result to categorize the challenge as one of approved and not approved;

receiving by the blobber available tokens from the challenge pool when the finalised result is approved;

receiving by the client the available tokens from the challenge pool when the finalized result is not approved;

releasing the locked tokens by the client;

returning the client tokens to the client after the releasing; and wherein locking, receiving, sending, and releasing of the locked tokens is automatically regulated using the blockchain protocol on the blockchain platform.

2. The method of claim 1, further comprising:

queueing the service by the blockchain protocol on the blockchain platform based on quantity of the locked tokens;

evaluating reward versus size of the transaction to make a processing decision wherein the processing decision is one of processing and not processing;

responsive to determining the processing decision is not processing, terminating the service, unlocking the locked tokens, and returning the locked tokens to the client;

responsive to determining the processing decision is processing, processing the service by the blockchain platform wherein the processing further comprises:

staking, by the service provider, service provider tokens subject to losing and earning based on an evaluation of services provided by the service provider.

3. The method of claim 1, further comprising:

providing a long-term service by a sharder to the blockchain platform; and earning additional tokens that are a percentage of the earned tokens from the transaction.

4. The method of claim 1, wherein the signed write-marker comprises: root information, a hash of the root directory on a file system, previous root information for versioning, and write counter to give a total size to date of the files transferred.

5. The method of claim 1, further comprising:

receiving authorization ticket by the client confirming the transaction and terms of service.

6. The method of claim 5, further comprising:

sharing the authorization ticket for read.

7. An information handling system (a local node) on a blockchain platform for performing a service according to a blockchain protocol, comprising:

one or more processors;

a memory coupled to at least one of the processors;

a network interface that connects the local node to one or more remote nodes; and a set of computer program instructions forming a submission module, a reception module, a send module, and a release module stored in the memory and executed by at least one of the processors in order to perform actions comprising:

negotiating a smart contract between a client and one or more service providers to establish a payment in tokens from the client to the service providers for executing a plurality of transactions to perform the service wherein the service providers are one or more blobbers;

issuing a storage agreement transaction between the blobber and the client by the client to the blockchain platform;

locking by the submission module one or more client tokens by the client for a limited period of time as defined by the negotiated smart contract;

receiving by the reception module interest tokens by the client responsive to the locking of the client tokens using a multiplier, wherein the interest tokens are the blobber's pay based on the negotiated smart contract;
sending by the send module a portion of new tokens to perform the transactions by the one or more service providers and wherein the service providers are at least one of: miners, blobbers, and sharders;
creating a blobber reward pool and a challenge pool based on the received interest tokens wherein a portion from the blobber reward pool is allocated for one or more validators who are responsible for verifying a challenge and the one or more blobbers receive tokens from the challenge pool for satisfying a challenge out of the challenge pool;
transferring data in a form of files and metadata, by the client, to the blobbers;
responsive to the transferring data, based on an amount of the transferred data, transferring selected blobber token rewards from the blobber reward pool to the blobber challenge pool;
issuing a signed write-marker, by the client, indicating a confirmation from the client as to the transferred data;
receiving the files to write by the blobber;
writing the files to a non-volatile storage medium by the blobbers;
issuing a write completion transaction by the blobber;
receiving by the blobber a random write verification challenge from the blockchain platform wherein the random write verification challenge includes a randomly selected blobber data allocation, a number of validators randomly selected, a random seed which determines indices of data blocks in the randomly selected blobber data allocation subsequent to the issuing of the write completion transaction;
in response to receiving the random write verification challenge, broadcasting to the validators, by the blobber, data including a file system metadata, a latest write marker, challenge blocks chosen pseudorandomly using the random seed, and at least one out of two penultimate hashes of a Merkle tree;
in response to receiving the broadcasted data by the validators, validating the received broadcasted data by initiating a validation proof process through which the validators verify the selected blobber data allocation that the blobber must supply, the latest write marker, the file system metadata is valid, a file system root hash matches the latest write marker, and the latest write marker matches a most recent commitment to the blockchain;
utilizing the random seed, the validators verify the challenge blocks chosen pseudorandomly;
verifying the Merkle tree matches up to the file metadata;
storing two penultimate hashes comprising the blobber provided at least one out of the two penultimate hashes of the Merkle tree and a validator calculates a remaining penultimate hash value out of the at least one out of the two penultimate hashes of the Merkle tree using the file system metadata, wherein the two penultimate hashes of the Merkle tree are hashed together to give the Merkle root of the randomly selected blobber data allocation;
broadcasting by the validators precommit signed hashes of the two penultimate hashes to the blockchain platform;
receiving the broadcasted validators precommit signed hashes;
determine a combined validation result wherein the combined validation result is based on a validated count, a not validated count, and a predetermined accepted validated count out of the number of validators;
sending the combined validation result to the smart contract;
accepting by the smart contract a first received validation result to categorize the challenge as one of approved and not approved;
receiving by the blobber available tokens from the challenge pool when the finalized result is approved;
receiving by the client the available tokens from the challenge pool when the finalized result is not approved;
releasing by the release module the locked tokens by the client;
returning the client tokens to the client after the releasing; and
wherein locking, receiving, sending; and releasing of the locked tokens is automatically regulated using the blockchain protocol on the blockchain platform.

8. The system of claim 7, further comprising:
queueing by a queue module the service by the blockchain protocol on the blockchain platform based on quantity of the locked tokens;
evaluating by an evaluation module reward versus size of the transaction to make a processing decision wherein the processing decision is one of processing and not processing;
responsive to determining the processing decision is not processing, terminating the service, unlocking the locked tokens, and returning the locked tokens to the client;
responsive to determining the processing decision is processing, processing the service by the blockchain platform wherein the processing further comprises:
staking, by the service provider, service provider tokens subject to losing and earning based on evaluation of services provided by the service provider.

9. The system of claim 7, further comprising:
providing by a provider module a long-term service by a sharder to the blockchain platform; and
earning by an earn module additional tokens that are a percentage of the earned tokens from the transaction.

10. The system of claim 7, wherein the signed write-markers comprise: root information, a hash of a root directory on a file system, previous root information for versioning, and write counter to give a total size to date of the files transferred.

11. The system of claim 7, further comprising:
receiving by a receive module authorization ticket by the client confirming the transaction and terms of service.

12. The system of claim 11, further comprising:
sharing by a share module the authorization ticket for read.

* * * * *